Sept. 16, 1924.
N. S. CLARKE
1,508,923
APPARATUS FOR SEPARATING OIL FROM OIL SANDS
Filed July 5, 1923    2 Sheets-Sheet 1
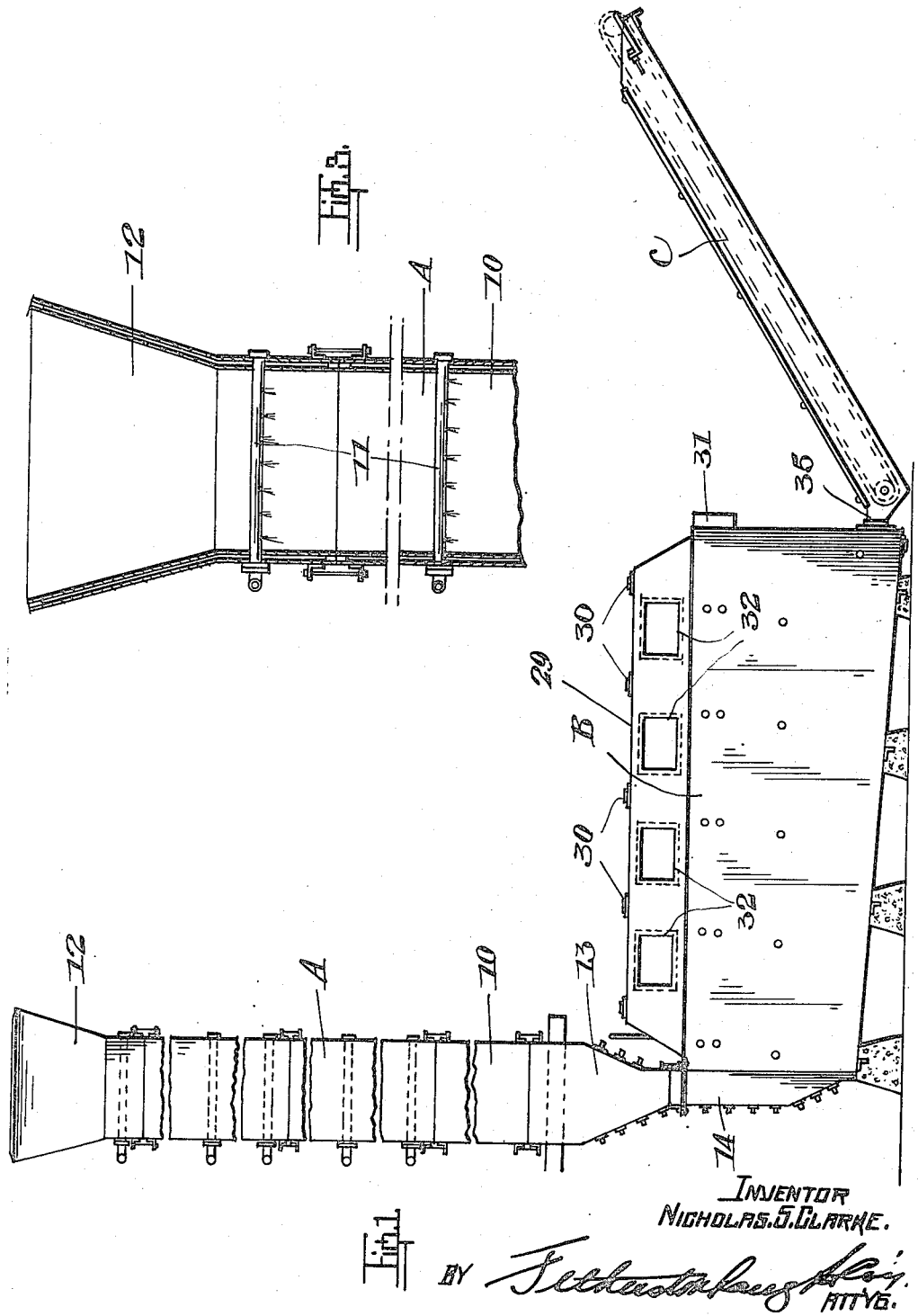

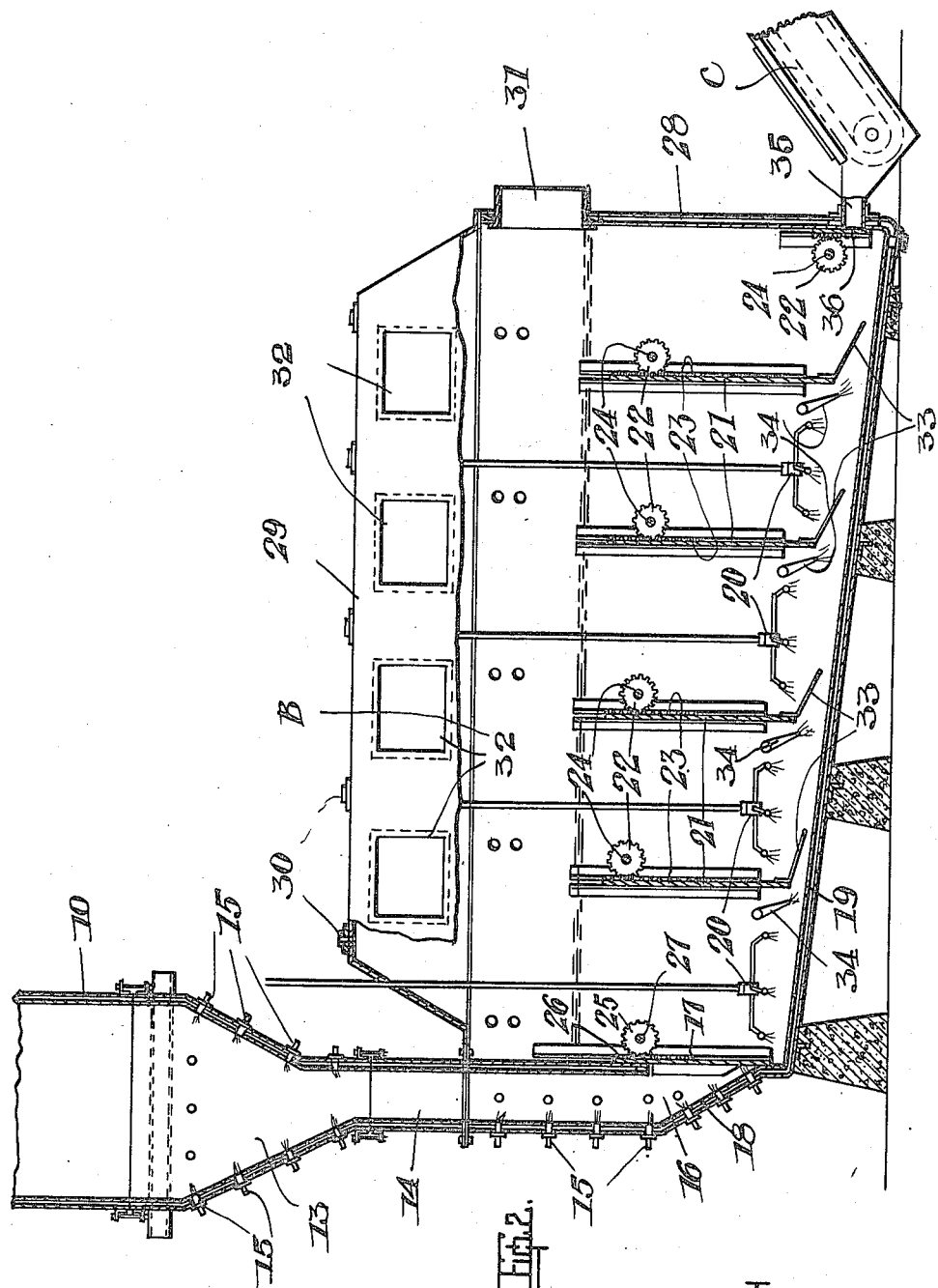

Patented Sept. 16, 1924.

1,508,923

UNITED STATES PATENT OFFICE.

NICHOLAS SHOULDICE CLARKE, OF NEW YORK, N. Y., ASSIGNOR TO ATHABASCA OIL PRODUCTS LIMITED, OF EDMONTON, ALBERTA, CANADA.

APPARATUS FOR SEPARATING OIL FROM OIL SANDS.

Application filed July 5, 1923. Serial No. 649,758.

*To all whom it may concern:*

Be it known that I, NICHOLAS SHOULDICE CLARKE, a subject of the King of Great Britain, and resident of the city of New York, in the State of New York, United States of America, have invented certain new and useful Improvements in Apparatus for Separating Oil from Oil Sands, of which the following is a specification.

This invention relates to improvements in apparatus for the separating of oil from oil sands, and other material in which it is found; and the objects of the invention are to provide a simple and economical apparatus capable of operation under commercial conditions which will enable a maximum amount of oil and other products to be recovered from the material treated.

Further objects of the invention are to provide such an apparatus as will be automatic in its operation, and may be adjusted in its operating details to suit the character of the oil sands or other material being treated.

Further objects still are to provide simple and effective means for causing the disintegration of the sand and the separation therefrom of the crude oil and bituminous products.

Further objects are generally to improve and simplify the apparatus to enable the results hereinafter described to be obtained.

In carrying out my improved apparatus, the oil sands are first passed through a vertical treating chamber in which partial disintegration is caused to take place by the treatment of the sand with a mixture of superheated steam and a suitable gas, then passed to a separating tank in which a further disintegration and maceration takes place through the action of a plurality of rotary sprays, the greater flow being controlled by suitable control gates. Following this, the volatile product and oil separated at this stage of the process are separately recovered and treated in any desired way to recover the ultimate product in the form desired, and the residual body is conveyed away for further treatment by dehydration, or otherwise, as hereinafter more fully set forth and described in the drawings and specification.

The drawings show the preferred form of apparatus for carrying out the process referred to.

In the drawings:

Figure 1 is an elevation showing an embodiment of the apparatus.

Figure 2 is an enlarged sectional elevation taken through the separating tank.

Figure 3 is a sectional elevation, showing the upper part of the first treating chamber.

In the drawings like characters of reference indicate corresponding parts in all the figures.

Referring to the drawings:

A indicates the first treating chamber, or stack, or bin, into which the oil sand or other material to be treated is first fed, and B, the separating chamber connected therewith from which the conveyer leads.

The treating chamber A is in the form of a stack having a steam jacket 10, and being preferably arranged vertically of sufficient height to enable the sand being treated to be substantially softened and disintegated during its passage therethrough, the softening and disintegrating process being augmented by means of a spray introduced through a plurality of transversely extending supply pipes 11 through which steam is introduced.

The steam is preferably superheated and mixed with a hydrocarbon gas such for example as that produced by distillation of the oil during the operation of the process. The pressure may be from eighty pounds or more to correspond with the design of the apparatus. In this way a highly saturated gaseous mixture is produced which is very effective in separating the oil.

The upper part of the chamber A is formed with a hopper 12 into which the material is fed, and the lower part is formed with a tapered portion 13 which reduces the rate of flow of the material and feeds it through a restricted treating passage or neck 14. The sides of the tapered portion 13 and the neck 14 are provided with a plurality of nozzles 15 through which steam or steam and a gas is injected into the mixture.

A suitable outlet 16 is formed in the bottom of the passage 14 from which the material passes into the separating tank B, the opening being controlled by a suitable sliding gate 17 of any convenient design, the bottom of the package 14 being provided with an inclined portion or chute 18 discharging through the opening 16.

The treating chamber B is provided with an inclined bottom 19 along which the material is passed by the action of gravity assisted by the action of a plurality of rotary spray nozzles 20 of any convenient design located in the sepearating tank between vertically slidable gates 21. These rotary spray nozzles are designed to rotate about a vertical axis, the rotation being effected from the discharge of steam or water through the nozzles in the usual way.

The control of the flow is effected by the gates 21 which are raised vertically by convenient means as by the pinions 22 engaging racks 23 on the gates. The pinions 22 are mounted on suitable shafts 24 and rotated by any convenient means.

The gate 17 is conveniently raised and lowered by a similar rack and pinion arrangement including a pinion 25 engaging a rack 26 on the gate, the pinion being mounted on the shaft 27 which is rotated by suitable means. A steam jacket 28 may be provided about the chamber B.

29 indicates the cover for the chamber from which a volatile product may be withdrawn through outlets 30, the oil free during this part of the process passing out through the outlet 31. The cover 29 may be provided on its tapered sides with a plurality of inspection windows 32.

To prevent the spray from the nozzles 20 interfering with the passage of the material beneath the gates 21, flanges or aprons 33 may be provided on the lower edge of the gate turned laterally in the direction of flow, and a plurality of spray nozzles 34 may be provided in advance of the opening beneath the bottom of each gate and the bottom of the tank so as to facilitate the passage of material beneath the gate.

The solid material finally passes out of the separating tank through a suitable outlet 35 controlled by a sliding gate 36 of the same designed as the gates already described. The material passing through the outlet 31 passes on a suitable drying conveyer C of any convenient design from which the material is conveyed to a point at which suitable apparatus is provided for further treatment by way of dehydration and ultimate distillation.

A water level is maintained in the treating tank B at about the upper level of the gates 21.

In practising the invention or process, the raw material, which may for instance be the oil sand such as found in the northern part of Alberta, Canada, is fed into the upper part of the first treating chamber A. This treating chamber is relatively high as for instance thirty or forty feet.

During the passing through this chamber the material is subjected to the action of heat as well as to the action of superheated steam and the hydro carbon gas which separates the light oil in the material, and in addition serves to break and macerate the same. More or less of the spray nozzles may be provided to correspond with the character of the sand being treated.

As the material passes into the separating chamber B, the oil will rise to the surface of the water therein, and in addition the oil encountering the water will force some of the water into steam and assist the disintegration process. The material at this stage being forced with the water introduced into the spray nozzles 20 should be relatively fluid and flow freely through the separating chamber B, the oil and asphalt continuously rising and being drawn out through the outlet 31, while any vaporous products such as hydro carbon gases will be drawn through the outlets 30.

The sand freed from oil and asphalt, passes out through the outlet 35. The oil and asphalt passing off through the outlet 31 may be further treated as well known in the art, to recover a variety of products.

It will be seen that the material may be continuously fed through the apparatus, and during such operation will receive the necessary treatment to disintegrate and separate the various constituents of the oil sands to enable them to be ultimately recovered in suitable form for commercial use.

The apparatus is simply constructed and easy to operate, and may be readily transported to any location where it is desired to treat the sands.

As many changes could be made in the above process and many apparently widely different embodiments of my invention within the scope of the claims, constructed without departing from the spirit or scope thereof, it is intended that all matter contained in the accompanying specification and drawings shall be interpreted as illustrative and not in a limiting sense.

What I claim as my invention is:

1. In apparatus of the character described, a separating tank having an inclined bottom and a plurality of adjustably sliding gates to control the passage of material therethrough, and a plurality of rotary spray pipes in the said treating chamber.

2. In apparatus of the character described, a separating tank having an inclined bottom and a plurality of adjustably sliding gates to control the passage of material therethrough, and a plurality of rotary spray pipes in the said treating chamber, the said spray pipes being located between the gates.

3. In an apparatus of the character described, a separating tank having a slidable controlling gate therein, and a spray nozzle designed to discharge between the bottom of the gate and the bottom of the tank.

4. In an apparaus of the character described, a separating tank having a slidable controlling gate therein, a spray nozzle designed to discharge between the bottom of the gate and the bottom of the tank, and a rotary spray nozzle in advance of the gate.

5. An apparatus of the character described comprising a relatively long and narrow vertically extending treating chamber having a tapered bottom, a treating neck leading from the tapered bottom, spray pipes in the treating chamber, a plurality of nozzles in the treating neck, and a separating chamber connected to the bottom of the treating neck having means for controlling the passage of flow therethrough, and means for mixing the material passing through the separating tank with a liquid.

6. An apparatus of the character described comprising a vertically extending stack, means for spraying the material passing therethrough, a separating tank connected to the bottom of the stack, means for causing the material to pass therethrough, controlling gates in the separating tank, and spray nozzles between the said controlling gates.

7. An apparatus of the character described comprising a vertically extending stack, means for spraying the material passing therethrough, a separating tank connected to the bottom of the stack, means for causing the material to pass therethrough, controlling gates in the separating tank, and spray nozzles between the said controlling gates, and a continuous conveyer leading from the separating tank.

In witness whereof I have hereunto set my hand.

NICHOLAS SHOULDICE CLARKE.